US008991884B2

(12) United States Patent
DeLouis

(10) Patent No.: US 8,991,884 B2
(45) Date of Patent: Mar. 31, 2015

(54) ROBOTIC HAND WITH CONFORMAL FINGER

(75) Inventor: Mark J. DeLouis, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 0 days.

(21) Appl. No.: 14/006,433

(22) PCT Filed: Mar. 21, 2012

(86) PCT No.: PCT/US2012/029919
§ 371 (c)(1),
(2), (4) Date: Sep. 20, 2013

(87) PCT Pub. No.: WO2012/129288
PCT Pub. Date: Sep. 27, 2012

(65) Prior Publication Data
US 2014/0007730 A1     Jan. 9, 2014

Related U.S. Application Data

(60) Provisional application No. 61/454,830, filed on Mar. 21, 2011.

(51) Int. Cl.
*B25J 15/00*     (2006.01)
(52) U.S. Cl.
CPC ............ *B25J 15/0009* (2013.01); *Y10S 901/39* (2013.01); *Y10S 901/38* (2013.01)
USPC ................ 294/106; 294/111; 901/38; 901/39
(58) Field of Classification Search
USPC ................ 294/106, 111, 213; 623/24, 57, 64; 901/31, 32, 36, 38, 39; 414/5
See application file for complete search history.

(56) References Cited

U.S. PATENT DOCUMENTS

| | | | | |
|---|---|---|---|---|
| 4,921,293 | A | * | 5/1990 | Ruoff et al. ............... 294/111 |
| 4,946,380 | A | * | 8/1990 | Lee ............................ 623/24 |
| 4,957,320 | A | | 9/1990 | Ulrich |
| 5,062,673 | A | | 11/1991 | Mimura |
| 5,570,920 | A | * | 11/1996 | Crisman et al. ............ 294/111 |
| 5,762,390 | A | | 6/1998 | Gosselin et al. |
| 8,641,114 | B2 | * | 2/2014 | Kurita et al. .............. 294/106 |
| 2001/0028174 | A1 | * | 10/2001 | Matsuda et al. ........... 294/106 |
| 2010/0259057 | A1 | | 10/2010 | Madhani |
| 2011/0163561 | A1 | * | 7/2011 | Kim et al. ................. 294/111 |
| 2011/0241368 | A1 | * | 10/2011 | Kurita et al. .............. 294/213 |

FOREIGN PATENT DOCUMENTS

JP          6104310 B2    12/1994

* cited by examiner

*Primary Examiner* — Paul T Chin
(74) *Attorney, Agent, or Firm* — The Webb Law Firm

(57) ABSTRACT

A robotic finger assembly can include a base for mounting the finger to a robotic hand, with the base having a motor, and at least three links. The links of the robotic hand are connected to each other and to the base by a series of joints. A joint shaft and a pivot shaft, where the pivot shaft can freely move within its respective joint shaft, is connected to a preceding link. The motor is activated for opening or closing the finger. The finger closes on an object with a distributed force across the links. Grasping also can mean engaging an object like a human hand, by closing the first finger link until it engages the object, then closing the second finger link until it engages the object, then closing the third link until it engages the object. A robotic hand assembly is also disclosed.

13 Claims, 21 Drawing Sheets

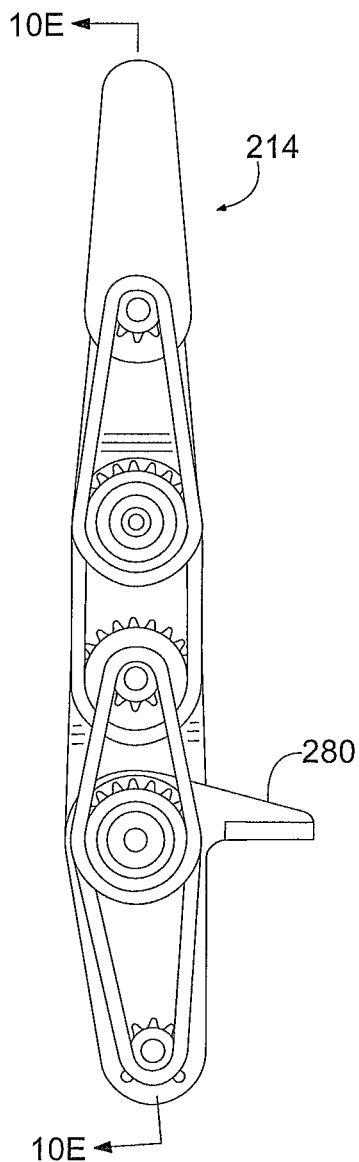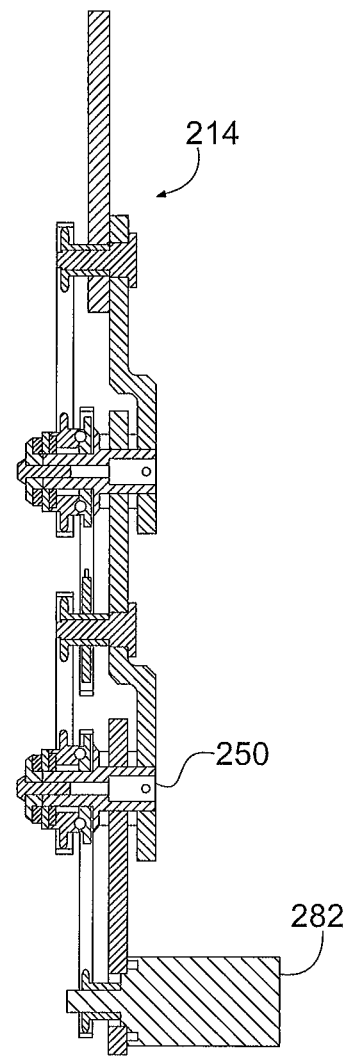
Fig. 10D
Fig. 10E

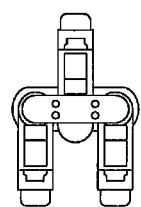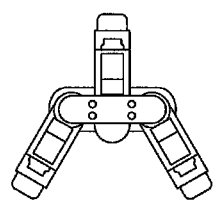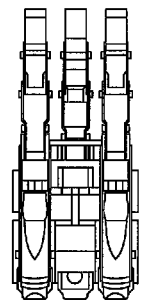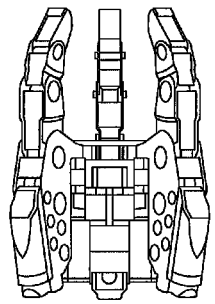
Fig. 17A                Fig. 17B

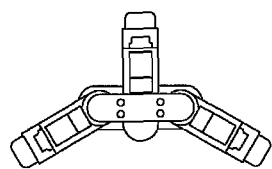
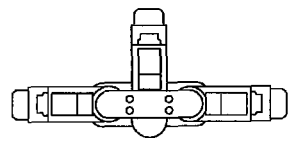
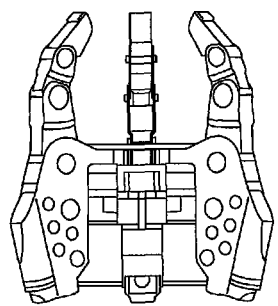
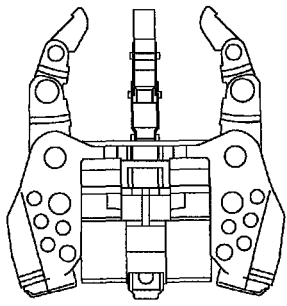
Fig. 17C    Fig. 17D

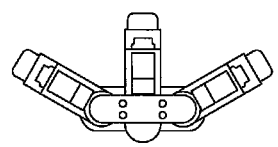
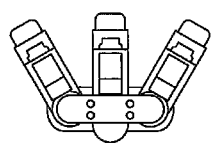
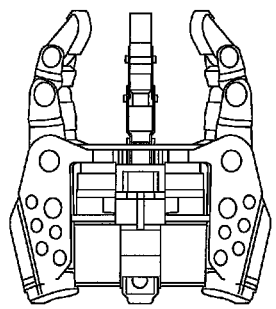
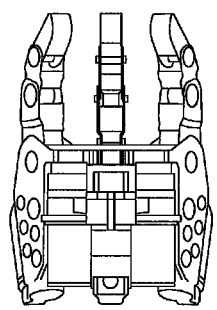
Fig. 17E  Fig. 17F
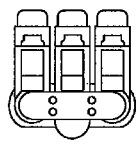
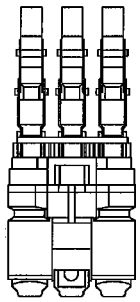
Fig. 17G

ROBOTIC HAND WITH CONFORMAL FINGER

BACKGROUND OF THE INVENTION

1. Field of the Invention

The present invention relates to a robotic finger which can be used on a robotic hand.

2. Description of Related Art

Military and law enforcement groups are increasingly relying on UGVs to perform life-threatening tasks ranging from under car inspection to EOD. As small UGVs, such as Omni-Directional Inspection Systems (ODIS), Talon and Packbot have gained acceptance, the variety of tasks they have been required to perform has increased.

These systems are deployed in uncontrolled environments. They must have a robust design to survive the normal working environment they will encounter, both during deployment on the mobile robot and when the manipulator and tools are being stored or transported. The mechanical connection must be resilient to minor variations in tolerances of mating components, such as might occur when a tool is dropped or bumps against another tool in the toolbox, or such as might be caused by the presence of debris, such as dirt and sand, from the working environment.

In the past, movement of fingers is accomplished through very complex mechanical linkages and has often required specialized configurations to accomplish their particular mission, requiring change of the tool or attaching a different end effector or tool in the middle of a mission.

SUMMARY OF THE INVENTION

The present invention provides a robotic finger having confirming conforming movement, and distributive force which can be used for pinching or grasping. The robotic finger assembly can include a base for mounting the finger to a robotic hand, with the base having a motor, and at least three links. The links of the robotic hand are connected to each other and to the base by a series of joints. The joints can include a joint shaft and a pivot shaft, where the pivot shaft can freely move within its respective joint shaft and is connected to a preceding link. The motor is activated for opening or closing the finger. Closing the finger can use a grasping behavior in the finger, where the finger closes on an object with a distributed force across the links. Grasping also can mean engaging an object like a human hand, by closing the first finger link until it engages the object, then closing the second finger link until it engages the object, then closing the third link until it engages the object. To reset the finger, an operator can fully open the finger.

Tension is caused in the finger when it grasps or pinches. The tension between the finger joints is caused by engagement of the links on the object, and tension increases pressure distribution across the object. To control torque in the finger links, a diameter of each joint is based on the relative length of the links, wherein the finger is in static equilibrium when pinching an object.

The finger is pre-tensioned to cause stiffness in the joint, such that finger links retain their position with respect to each other for a preset configuration. The pretension in the finger causes the finger to retain the configuration when the motor is activated for closing the finger. The finger provides force to the finger tip, where the finger tip can be used for pinching.

The finger further includes clutches associated with each joint, the clutches are activated as closing tension in the finger increases, because the tension is providing pressure on each finger link, the tension distributed to the joints can be a function of the clutches in the joints. Clutches can be implemented using gears, sprockets or pulleys, or any combination.

The finger can include two clutches, with a first clutch included between the base and the first link and a second clutch included between the first link and the second link.

The clutch can include a joint pulley including an inner surface, where the inner surface of the joint pulley engages an outer surface of the joint shaft. The engaging surfaces defining control friction. Likewise, an intermediate pulley including an inner surface, the inner surface of the joint pulley engaging an outer surface of the intermediate shaft, whereby the engaging surfaces form control friction. The clutch operating with a belt threaded onto the joint pulley and intermediate pulley, and the clutch is activated when the link engages an object, causing tension in the belt and forcing the joint pulley to move relative to the joint shaft and/or the intermediate pulley to move relative to the intermediate shaft. The relative movement in the pulley, between the joint shaft and the joint pulley, and the intermediate pulley, between the shaft and pulley, causes control friction in the respective joint.

A drive train can be attached to a belt, to pull the belt to close the finger, wherein the drive train forces tension to the front of the finger. The motor activates the drive train. Control friction is configurable to achieve a specific pressure distribution. Control friction is configured by changing the radius of the pulley shaft and joint pulley, and increasing the pulley shaft in relation to the joint pulley to increase resistance. The belt can be pretensioned to cause stiffness in the finger.

The clutch can include an input sprocket, an output sprocket, and balls. The input sprocket and output sprocket can include ramps on an inner surface for receiving the balls. The input sprocket engages the output sprocket to form a cavity. A chain can run the input sprocket, turning a joint shaft. Friction can increase as the input sprocket rotates relative to the output sprocket, and the balls engage the ramps within the cavities pushing the input sprocket from the output sprocket, and into a friction disk on the joint shaft. Tension in the finger causes the sprockets to move relative to each other increasing friction.

The finger can include a spring for engaging the output sprocket and causing stiffness in the joint. The finger can include a second chain or any number of chains, which rotatably connects the output sprocket to a next input sprocket.

A robotic hand assembly is also included, for grabbing and pinching an object. The robotic hand can include an adjustable finger and a stationary finger, where the fingers can be robotic finger assemblies, which can include a base for mounting the finger to a robotic hand, with the base having a motor, and at least three links. The links of the robotic hand are connected to each other and to the base by a series of joints. The joints can include a joint shaft and a pivot shaft, where the pivot shaft can freely move within its respective-joint shaft and is connected to a preceding link. The motor is activated for opening or closing the finger. Closing the finger can use a grasping behavior in the finger, where the finger closes on an object with a distributed force across the links. Grasping also can mean engaging an object like a human hand, by closing the first finger link until it engages the object, then closing the second finger link until it engages the object, then closing the third link until it engages the object. To reset the finger, an operator can fully open the finger.

The robotic hand can include a palm assembly, where the palm assembly comprises a gear reducer, a finger mount and a motor, and the fingers are mounted to the palm assembly, and the motor can activate the gear reducer, such that the gear reducer swings the adjustable finger.

The ramp angles are adjusted to control sensitivity, and a shallow ramp angle will increase sensitivity. The gear reducer provides dwell points for positioning the adjustable finger where a mechanical advantage exists. The gear reducer is an indexing cycloidal gear reducer. The dwell points occur every 30 degrees.

BRIEF DESCRIPTION OF THE DRAWINGS

FIG. 8 is a partially exploded view of the fingertip link of the finger in FIG. 7a;

FIG. 9 is a top perspective view of the trolley in FIG. 7a;

FIGS. 10a-10e are views of a mechanical clutch embodiment of the conforming finger assembly;

FIG. 14b, a cross sectional view of the cycloidal reducer of FIG. 14a;

FIG. 17 illustrates the robotic hand assembly of the present invention in multiple configurations of the adjustable fingers.

DESCRIPTION OF THE PREFERRED EMBODIMENTS

Figure 1:
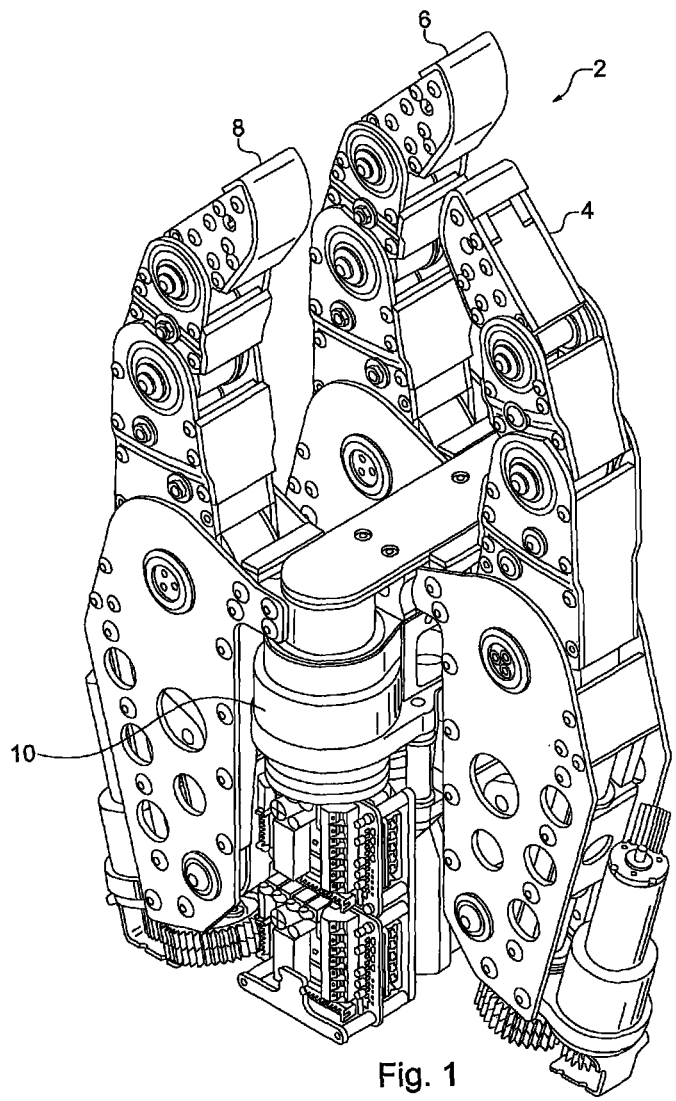
FIG. 1 illustrates a robotic hand assembly having conformal fingers of the present invention.
Figure 2:
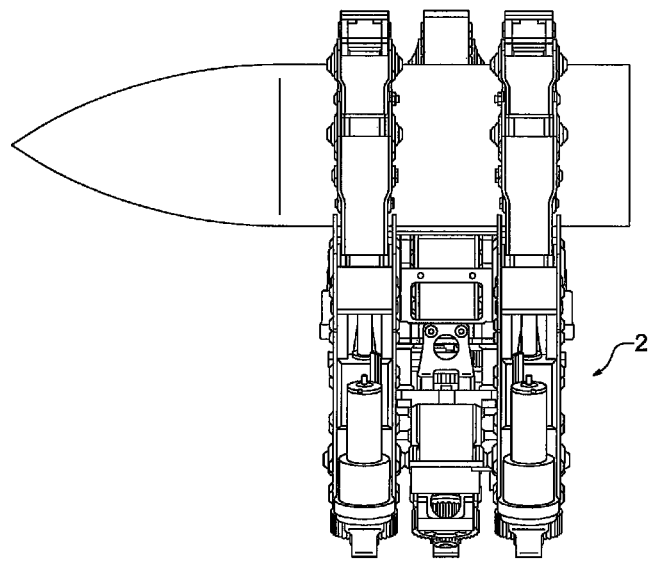
FIG. 2 illustrates a robotic hand assembly used to retrieve an artillery shell.
Figure 3:
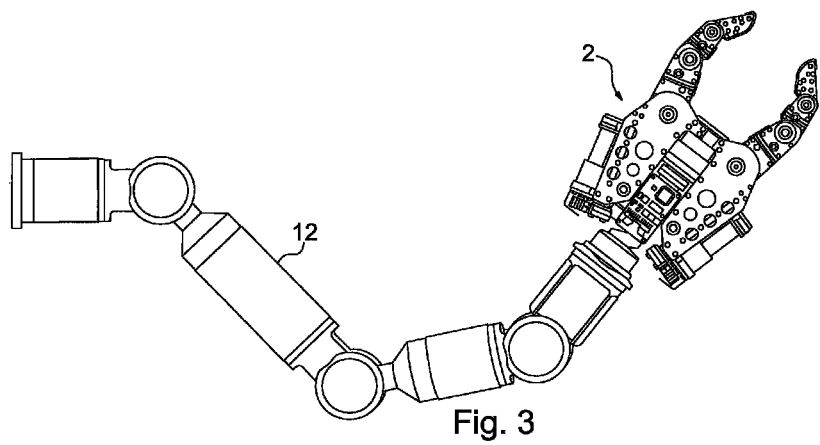
FIG. 3 illustrates a robotic hand assembly of the present invention mounted to a robotic manipulator.

With reference to FIG. 1, a robotic hand assembly 2 is shown, having conformal movement to provide both grasping and pinching of objects. The robotic hand assembly 2 includes a stationary finger 4 and two adjustable fingers 6 and 8. The fingers 4, 6, and 8 are lightweight and each driven by a single motor. The fingers are conforming and have a predictive behavior along with static equilibrium which provides adaptability to unique situations and environments. In addition, the hand assembly can have a palm actuator 10. The fingers 4, 6, and 8 are conformal fingers which can be used to grasp objects. The hand assembly provides the ability for the user to reset the fingers by operating the hand assembly to have the fingers fully open. When grasping an object, as shown in FIG. 2, such as a large artillery shell, the fingers conform to the object with a uniformity throughout the hand assembly 2 and provide distributed pressure throughout the object. As the fingers apply pressure to an object, in this case the artillery shell, the hand gets stiffer, providing a tight grip on the object. The fingers 4, 6, and 8, as shown, are wrapped firmly around the shaft of the shell providing a firm grasp on it to prevent it from falling during operation of the robotic hand assembly 2. The robotic hand assembly is adaptable to work on unmanned vehicles and it can be connected to a robotic arm 12 as shown in FIG. 3. When connected to a hand assembly 2, the arm 12 can be used to forward signals from a robot or unmanned vehicle (not shown) to the hand assembly 2 for operating the hand assembly and the conformal fingers. The arm 12 can be used to pick up very heavy objects, such as heavy artillery shells, some weighing well over 100 lbs. The hand assembly 2 can also be opened and closed by the operator at a remote location.

The robotic finger 14 provides the same bending configuration as a human hand and similar behavior to the human hand. With reference to FIGS. 4a-4e, a robotic finger 14 generally includes a link 16, which is pivotally connected to a second link 18, with second link 18 pivotally connected to a third link 20. In addition, the first link 16 is mounted to a base 22. The links are pivotally connected at joints 24, 26, and 28, where a pivot shaft is passing through the interior link and connected to the outer link. The base 22 includes a single motor which can drive the finger using a trolley, pulleys, or a continuous belt. The finger 14 can have a lower surface 30, a middle gripping surface 32, and a fingertip surface 34. The surfaces 30, 32 can have a special material covering them providing grip for different types of environment. The finger 14 includes 3 links and a base, however, it is envisioned that any number of links could be combined to form a finger using the same concepts.

The human-like behavior of the hand assembly 2 is predictive. Predictive behavior is important because it provides intuitive and predictable grasping of any arbitrarily-shaped object, such as the artillery shell in FIG. 2. The fingers 4, 6, and 8 close at a uniform rate, but each will close independently to allow secure grasping of arbitrarily shaped objects such as rocks or other debris. The fingers also open uniformly. When gripping an object, the artillery shell in FIG. 2, first the link 16 will rotate about joint 24 until the link 16 comes into contact with an object and it cannot pivot anymore. If the link does not contact an object, it will eventually stop because it reaches its limit, when the two links meet, at which point the joint can no longer pivot because movement is blocked by the other. After the pivot of the link 16 stops, the second link 18 then begins to move and it will rotate around the joint 26, until it moves into contact with an object or it reaches a limit. When the second link 18 stops moving, only then will the link 20 begin moving, pivotally rotating until it moves into contact with an object or reaches its limit.

For opening the hand, the behavior is the same. First, the link 16 pivots and the other two links 18 and 20 hold their position with respect to each other. Then link 18 will pivot, with link 20 remaining stationary until link 18 reaches a limit. Link 20 pivots last. Opening behavior resets the finger when it is fully opened and driving all the finger links to their stops.

The ability of the links of the finger to hold position is useful for providing specific configurations when the hand must be preconfigured to match a job. The fingers can be pre-positioned because of tension. In one embodiment, a belt creates a preset amount of tension between the pulleys and their shafts. The finger can be prepositioned automatically or manually by an operator of the hand to conform to a particular situation. After pre-positioning, the finger can be closed while still retaining its configuration. For example, the relative positioning of the finger links may be preset when the job to be performed requires pinching or gripping. For example, the fingers are preset when the job to be performed requires pinching an object instead of gripping when picking up a set of wires. For such a job, the fingers of the hand assembly 2 can be positioned into a pinching configuration, such that the fingers remain straight, except for the fingertip at the end of the finger, which could be pre-positioned substantially horizontal in relation to the finger and ideal for mating with an opposing finger to pick up a loose wire. With the fingers pre-positioned, the operator could then use the hand assembly to pinch objects.

Figures 4A, 4B:
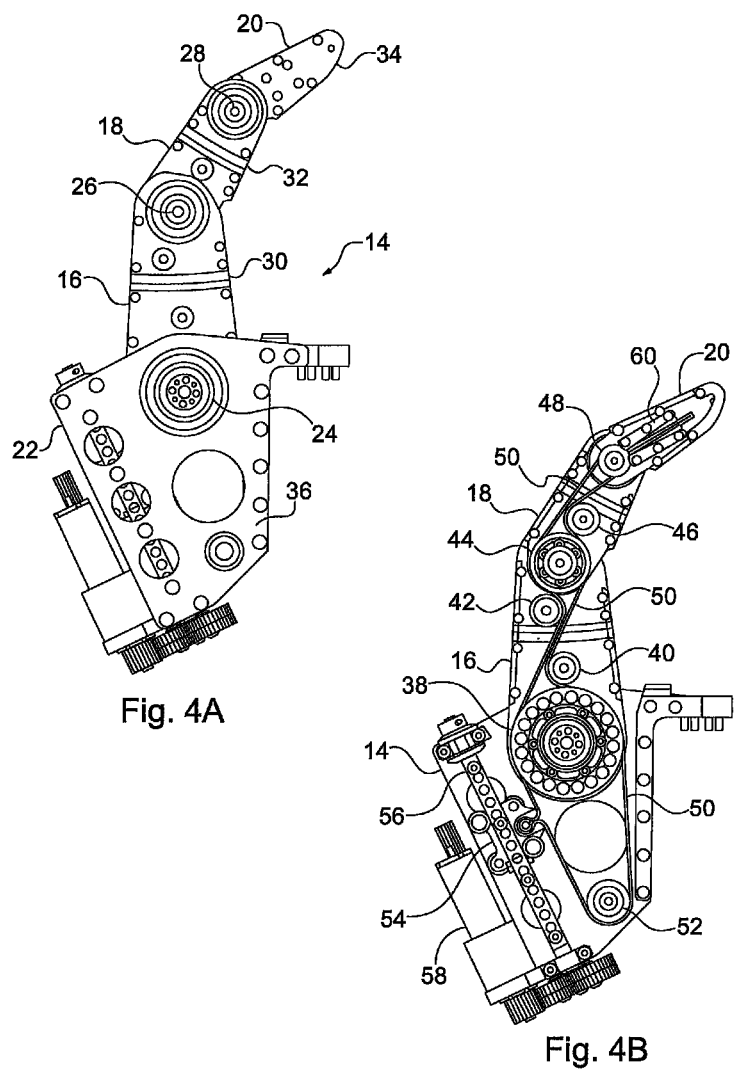
FIG. 4a is a side view of a robotic finger of the present invention.
FIG. 4b is a side view of a robotic finger of the present invention, having link plates removed to show inside the finger assembly.
Figure 4C:
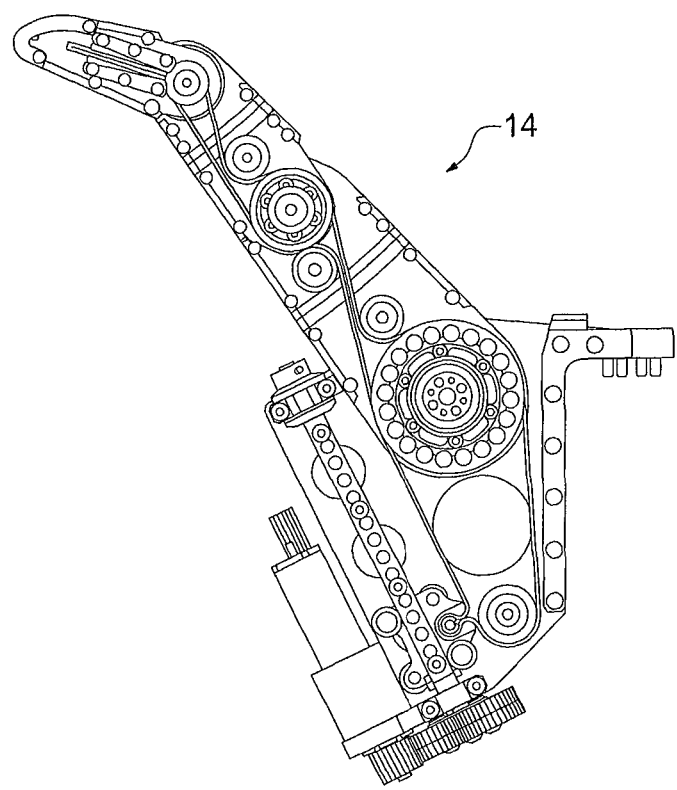
FIGS. 4c, 4d and 4e are views of the finger in FIG. 4a, having link plates removed to show belt routing with the robotic finger in alternate positions.

Static equilibrium occurs only when we are pinching in relation to pulley ratios. The static equilibrium is caused by an internal system of the finger assembly, such as joint pulleys and mechanical clutches. With reference to FIG. 4b, by removing link plate 36 and the corresponding link plates on each of the finger links 16, 18, and 20, the pulley system inside the robotic finger is shown. The robotic finger 14 includes a pulley system that provides the conformal movement of the finger links 16, 18 and 20. The finger 14 includes joint pulley 38, intermediate pulley 40, backloading intermediate pulley 42, joint pulley 44, intermediate pulley 46, and joint pulley 48. In addition, the finger base 22 includes a lower idler pulley 52. The pulleys have specific size based on the relative size of the links of the finger. The ratio of pulley radius to finger segment length produces a static equilibrium of the finger that applies when the finger is approximately straight.

The conformal finger 14 uses the pulleys 38, 40, 42, 44, 46, 48, and 50 in combination with a belt 50 to provide transmission friction in the finger, causing the predictive behavior of the finger for control of the order for closing and opening the finger. The belt closing transfers the finger load to the finger elements and structure as well as creating the conformal behavior of the finger. For one embodiment, the belt is securely attached at both the trolley and the fingertip and the belt is pre-tensioned during installation to ensure contact with all pulleys when the belt is under load, however, other attachment techniques can be used, for example, where the belt is only attached at one end, such as the trolley or the fingertip. In addition, the belt can be threaded as one continuous loop. In another embodiment, a continuous high strength Kevlar reinforced belt can be used.

Figure 4D:
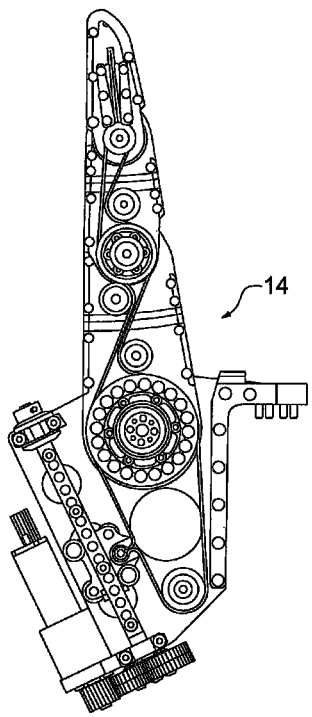
Figure 4E:
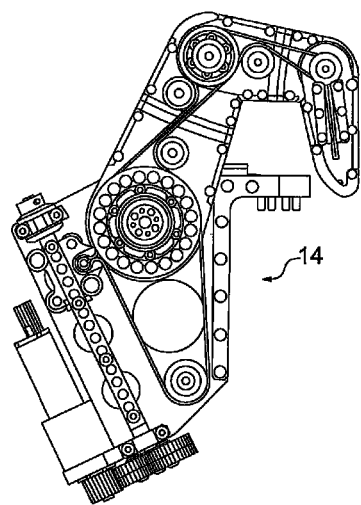

With continuing reference to FIG. 4b, the belt 50 of finger 14 can be threaded to a trolley 54 which can be included in the base 22. The belt 50 can be held in place by clamp, such as belt clamp 60. The trolley 54 moves up and down when a threaded member, such as acme screw 56, is engaged by the motor 58. The motor can receive electrical signals, including instructions from an operator via a palm assembly discussed hereinafter, to run the motor 58. When the trolley 54 moves up, it tightens the belt 50 on the front of the finger 14, causing the finger to close. When the trolley 54 is reversed, it causes tension on the back of the finger 14, causing the finger to open. The belt trolley can be used to tighten the belt and open and close the fingers, however, other transmission techniques can also be envisioned. As the trolley moves up, the finger will lock, but the belt continues to drive until the torque on the motor meets the threshold. The operator controls the current that goes to the motor so the motor has a certain force and holds the belt tight. FIGS. 4d-4e provide views of the finger as it moves from completely open in FIG. 4d to completely closed in FIG. 4e.

As shown in FIG. 4b, when closing the finger, the intermediate pulley ensures consistent belt contact on the belt is forced to wrap around the joint pulley, providing more force on that first pulley in addition to the friction force, providing a more predictable wrapping behavior of that first pulley joint. The belt can maintain contact and compression on the pulley due to the intermediate pulley. Without the intermediate pulley, if the finger was bent over, the belt could lose contact. The intermediate pulley also provides control friction. In addition, control friction can be used to provide a predictable distribution of pressure in the finger. The control friction causing distributive pressure in the finger once it has engaged an object and tension in the finger increases.

Figure 5A:
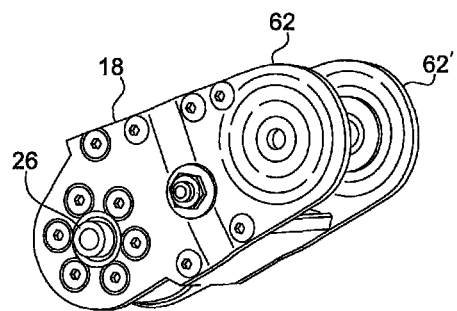
FIGS. 5a-5c show the middle link 18 of finger 14.
Figure 5B:
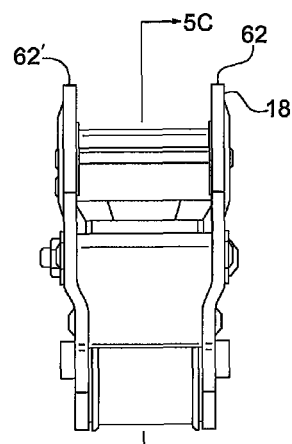
Figure 5C:
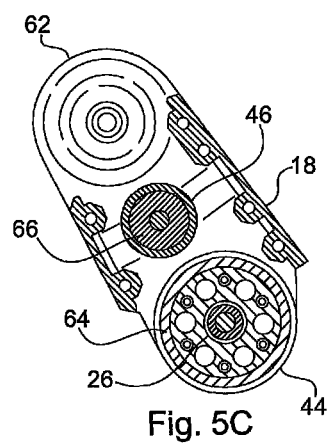

With reference to FIGS. 5a-5c, the middle link 18 of finger 14 is shown, unlinked from the finger, having link plates 62 and 62'. The link 18 includes a shaft 26 for connecting and pivoting about the first link of the finger. A cross-sectional view of the link 18 shows the parts, including the joint pulley 44 and intermediate pulley 46. The joint pulley 44 includes a stationary pulley shaft 64, which is fixed to the link plates 62 and 62'. The ends of the pulley shaft are attached to a portion of the first link plate 62, for example, using threaded members, such as a bolt pattern securing the pulley shaft 64 to the link plates 62 and 62'. The pulley shaft forms a hollow cavity for receiving the joint pivot shaft 26. In one embodiment, the control friction can be located between the joint pulley 44 and the pulley shaft 64. A joint pivot bearing can be positioned between the joint pivot shaft 26 and the pulley shaft, having minimal friction, the bearing providing a low friction coupling between the two shafts. During operation, the joint pulley 44 and pulley shaft 64 rotate together until resistance is met, thereafter causing friction force. The intermediate pulley 46 also includes a shaft, stationary pulley shaft 66. As in the joint pulley, friction force in the intermediate pulley 66 is caused by control friction between the intermediate pulley 46 and the pulley shaft 66. The intermediate pulley shaft is also fixed to the link plates 62 and 62'. The pulleys act as torque reaction clutches, thereby controlling the order of bend and the pressure distribution for the links as an object is being gripped. The inner pulley shaft 64 of the joint pulley 44 attaches to the first link plate 62 and second link plate 62'. The shaft 64 connects the link plates 62 and 62'. The joint pivot shaft 26 is received through the inner pulley shaft 64, passing through and connecting on either end to link 16. The joint pivot shaft 26 pivotally connects link 18 to link 16. The shaft 26 provides the pivot between the link 18 and link 16 of the finger 14. The joint pivot shaft 24 moves inside the pulley shaft 64 that is held stationary by the attachments in relation to the link plates 62 and 62'. The same configuration is provided between link 16 and the base 22. The third joint 28 has only the pivot shaft with the pulley 48 attached directly to the third link 20 side plates.

With continued reference to FIGS. 5a-5c, the joints connect the links of the finger 14, the pivot shaft attached to the preceding finger link. Without a belt, there would be little friction between two finger links, therefore, the finger elements move freely when no belt is present.

Figures 6A, 6B:
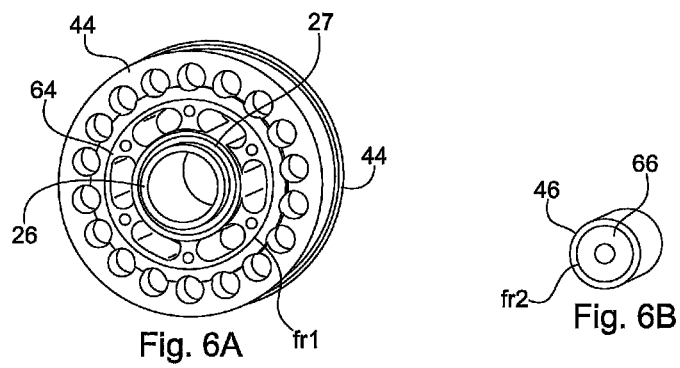
FIGS. 6a and 6b show a specific ratio provided between the joint pulley and its shaft and the intermediate pulley and its shaft.
Figure 6C:
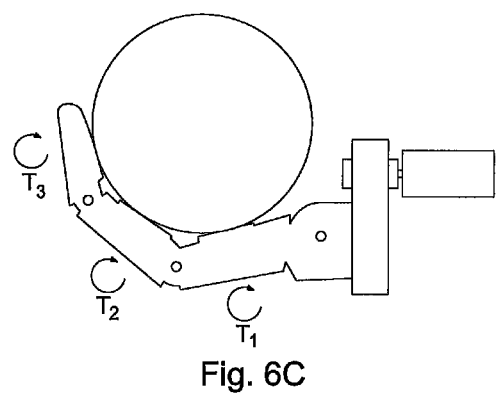
FIGS. 6c and 6d are side perspective view of a finger shown in static equilibrium.

With reference to FIG. 6a, the frictions (fr1) and (fr2) control stiffness in the joint. Initially, when closing, the finger is reacting to an object. The finger joints are closed until the links engage the built-in stops or until they engage the object.

The friction caused by the pulleys along with the relative pulley size controls the pressure distribution between the links and the object being grasped. The size (diameter) and position of the pulleys can control the closing order. The transmission friction is a function of the relative radius of each pulley to the shaft. The tangential force at the pulley surface is a function of torque and radial force, where torque is equal to u(Fr)(R1) where (u) is the coefficient of friction, (Fr) is the radial force and, (R1) is the radius of the shaft. The tangential force is equal to (T/R2) where (R2) is the radius of the pulley. Therefore, the tangential force, transmission friction, at the pulley surface, decreases as the radius of the pulley increases in relation to the radius of the shaft. Also, as the shaft radius (R1) increases to approach the radius of the joint pulley (R2), the torque forces required to turn the pulley for a given amount of friction increases. The force can therefore be controlled by configuring the radius of the pulley shaft in relation to the joint pulley. The force can also be controlled by configuring the intermediate pulley in the same way. The transmission friction is the sum of the friction for the joint pulley and the intermediate pulley. Friction (fr2) on the intermediate pulley combines with friction (fr1) of the joint pulley to determine the total friction between the finger elements. The friction force is used to distribute the force between the joints, therefore, if the friction force is greater in link 1 than link 2, then link 2 will provide more force when an object is gripped. While the intermediate pulleys located along the finger elements are responsible for friction control, other implementations can apply the friction to the joint pulleys. Any strong material can be used in the fabrication of joint pulleys. Material for the pulleys is chosen for wear resistance and coefficient of friction (frictional characteristics).

The force in the pulleys is distributed after the conformal finger wraps around an object by the transmission friction. The finger is conforming to the object because it is the object that defines the finger's shape. When grasping an object, such as picking up the artillery shell, the weight of the shell increases the belt tension. As the belt tension increases, friction in the joints distributes the tension around the object. The frictions are stronger in the first link compared to the fingertip, providing maximal force initially in the fingertip, although the finger provides a force that is constantly increasing along each element through the object that is being grasped. As it wraps around an object and tightens, the trolley continues to move up causing the belt to tighten on the front of the finger, all three of the elements tighten against the object.

As the shaft diameter approaches the outside diameter of the pulley, the torque forces required to turn the pulley for a given amount of friction increases. Running a belt over a pulley, rotates the pulleys with a known friction coefficient giving controlled resistance when the belt is providing a normal force radial to the joint pulley. The same thing happens at the intermediate pulleys, with friction between the intermediate pulley and the pulley shaft. The intermediate pulley compliments the friction of the joint pulley and provides the path for the belt to wrap around. As the finger joints move, the intermediate pulley causes the belt to wrap further around the joint pulley so that the belt is in continuous contact with the joint pulley regardless of the finger positions.

With continuing reference to FIGS. 6a and 6b, a specific ratio is provided between the joint pulley and its shaft and the intermediate pulley and its shaft. The tension in the belt causes a radial force on the pulleys which causes a clutch action when the belt is driving, by pushing the joint pulley against the pulley shaft. Force against the pulley pushes it against the shaft to form the clutch and causes friction increase. It is the radial force which, in turn, causes friction between each of the pulleys and their respective shafts. As a consequence, as the tension in the belt increases, so does the friction. Because of tension in the first joint, the tension in the belt decreases as it moves from the first joint formed by shaft 24 to the last joint formed by the shaft 28.

When the belt is pre-tensioned, the operator can fix the position of the finger by moving the finger manually. Normally, if force is applied somewhere other than the fingertip, one joint is going to move one way and the other joint will move another. With static equilibrium, once the finger is adjusted, the operator can close the finger to pinch an object and the finger will hold shape. The finger can remain straight or nearly straight without changing shape because of the ratio between each of the joints.

Figure 6D:
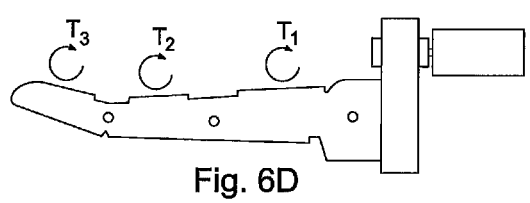

With reference to FIG. 6d, a finger in static equilibrium is shown. To accomplish static equilibrium, the joint pulley is a predetermined size with a specific size based on the relative lengths of the finger elements. To determine the size for each joint, the size of the links can be used. This ratio of joint pulley radius to finger element length produces the static equilibrium of the finger that applies when the finger is approximately straight. The three links are measured and the three lengths define what the proper ratio would be to achieve static equilibrium.

For a finger in static equilibrium, the pulley diameter ratio for joint 1 to joint 2 is the following:

$$N[1\text{-}2] = (\text{length of link1} + \text{length of link2} + \text{length of link3})/(\text{length of link2} + \text{length of link3})$$

For a finger in static equilibrium, the pulley diameter ratio for joint 2 to joint 3 is the following:

$$N[2\text{-}3] = (\text{length of link2} + \text{length of link3})/\text{length of link3}$$

The torque formulas for the finger in static equilibrium are $T1=F3(L1+L2+L3)$; $T2=F3(L2+L3)$; and $T3=F3\,L3$. Therefore, the greatest amount of torque would be needed at joint 1 (T1). The first joint needs greater torque than the second joint, and the second needs greater torque than the third joint. The torque is directly related to the pulley diameter. The pulley diameter ratios would be calculated using the above joint pulley diameter formulas.

Figure 7A:
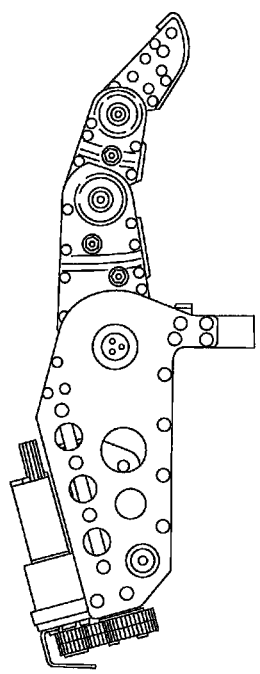
FIG. 7a is an embodiment of the finger assembly including a finger.
Figure 7B:
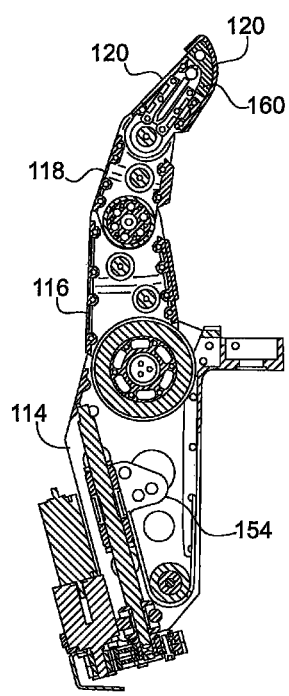
FIG. 7b is a view of the finger in FIG. 7a, having link plates removed to show inside the finger assembly.
Figure 8:
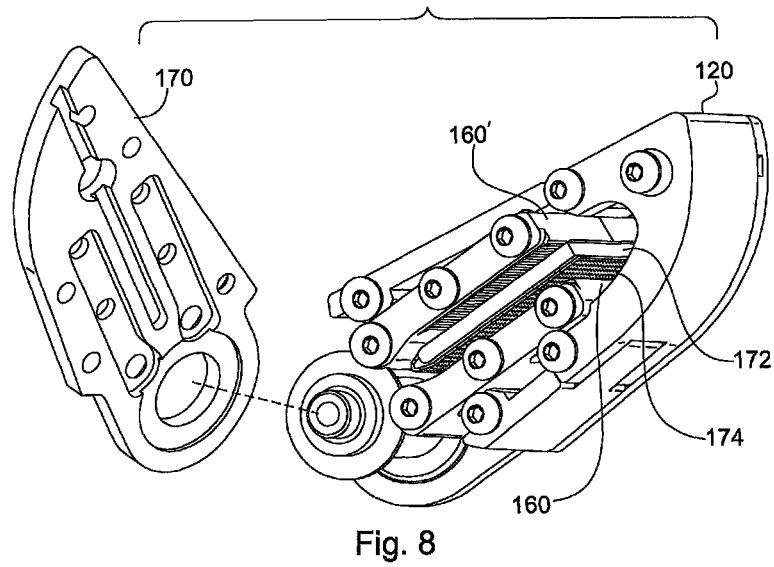

With reference to FIG. 7a, an embodiment of finger assembly includes finger 114 having links 116, 118, and 120. With reference to FIG. 7b, a cross-sectional view is shown of finger 114 with the pulley system for movement of the finger. With reference to FIG. 8, a partially exploded view of the fingertip link 120 of finger 114 is shown including link plate 170. Inside link 120, the belt can be firmly attached using a system of clamps. The finger grip must pull up to a thousand pounds of force without slipping. In one embodiment, in the fingertip link 120, belt clamp halves 160 and 160' are provided for wrapping the belt around. The clamps 160 and 160' can have a perforated surface or can have a grippable sheet attached. A wedge 172 can mate with the halves 160 and 160' to force the belt halves firmly into position. The two ends of the belt are gripped. A perforated sheet 174, such as a perforated brass piece, with teeth, can be positioned between the clamps before the wedge is positioned therein or alternatively glued to the wedge using adhesive, however, other types of wedges can be envisioned. As the wedge 172 pushes the clamps 160 and 160', squeezing the belt into teeth of the perforation in sheet 174, the belt is positioned tightly into engagement with the clamps 160 and 160', stopping the belt from slipping. In one embodiment, the clamps must not slip when holding a Kevlar coiled belt wrapped with rubber and around 1400 pounds of force.

Figure 9:
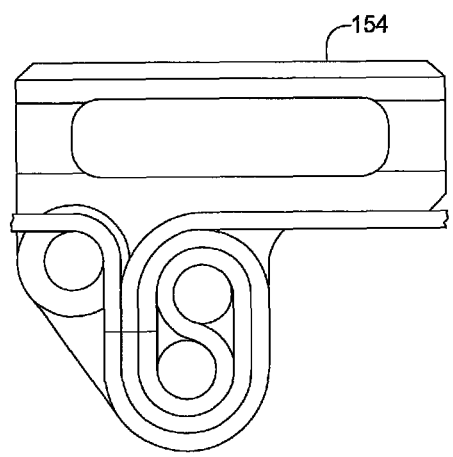

The finger moves using a trolley shown in a cross-sectional view seen in FIG. 7b. With reference to FIG. 9, a top view of the trolley 154 in FIG. 7a, having a pattern for connection of the belt to the trolley 154, the dashed line indicating the path that the belt takes around the pins, the attachment becomes quite solid, and locks it on and cannot slip. The trolley of the conformal finger includes a belt attachment that is rigidly connected to an acme screw. When the acme screw is engaged by the motor, the trolley moves up to tighten the belt on the front of the finger to close the finger. If the trolley is reversed, the tension of the belt on the back of the finger causes it to open.

A method of pre-positioning the conformal finger to use the finger in a confined space to grab something is provided. The method can be used with the robotic hand assembly by an operator who needs to access an object that is partially covered or blocked, for example, an explosive device in a pile of rubble, where the operator may need to pre-position to a certain configuration for the finger to maneuver into the pile in order to access and grip the explosive device. Having the fingers all the way open, the hand may not be able to fit through. Pre-positioning is possible because the finger has predicative behavior, such that the order which the links of the finger move is uniform each time the finger is opening or closing. To explain this, consider starting with the finger fully closed. Now when opening, the first link 16, moves first with the other two, 18 and 20, maintaining relative position. Once the first link contacts its stop in the opening direction, the second link 18, will begin to move with the last link 20 maintaining relative position. And once the second link contacts its stop in opening, the last link 20 may be positioned as desired. Now, proceed by closing the finger. Once again the first link 16 moves first. Once in contact with its stop in the closing direction, the second link 18 begins to move and may be positioned as desired. Finally, the first link may be opened and positioned as desired with the last two links maintaining their desired preset positions. By pre-positioning, the operator can use the finger in a confined space to get the hand in there to grab something within the confined space, for example, a pile of rubble having an explosive device inside and the operator wants to reach in and grab that explosive device. Having the fingers all the way open, it may not be able to fit through there so being able to close them partially in the right configuration to get in there or even once the operator is in there to be able to open and close to get to a certain configuration would be useful.

With reference to FIGS. 10a-10d, a mechanical clutch embodiment of the conforming finger assembly is shown. A mechanical conformal finger will provide predicative behavior and distributed pressure. The mechanical finger can also be preset. The finger has the ability to wrap around an object in a predefined order, first link, second link, third link, and then finally the ability to further lock up and become even stiffer as it wraps around a heavier object. A robotic finger 214 includes a link 216, which is pivotally connected to a link 218, with link 218 pivotally connected to a link 220. In addition, link 216 is mounted to a base 222. The links are pivotally connected at joints 224, 226, and 228, where a pivot shaft forms a joint between the links. The base 222 includes a single motor 282 which can drive the finger using torque reaction clutches.

Figure 10A:
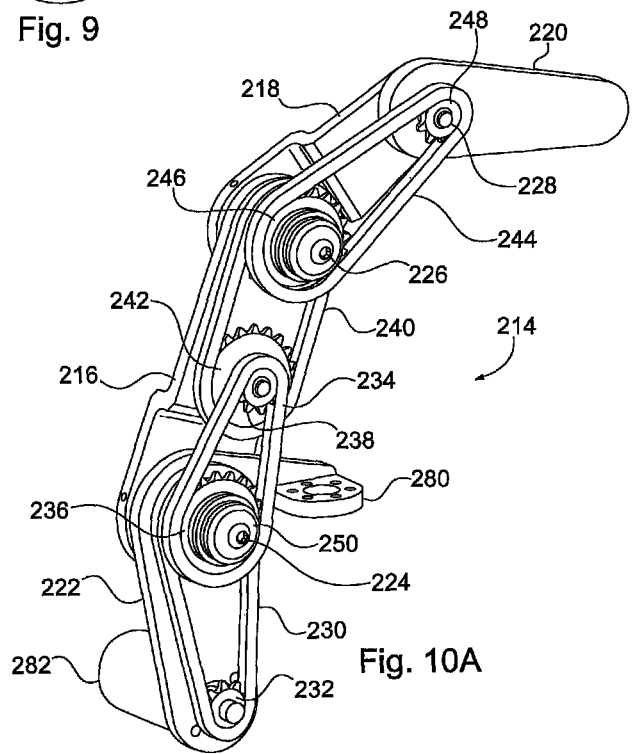
Figure 10B:
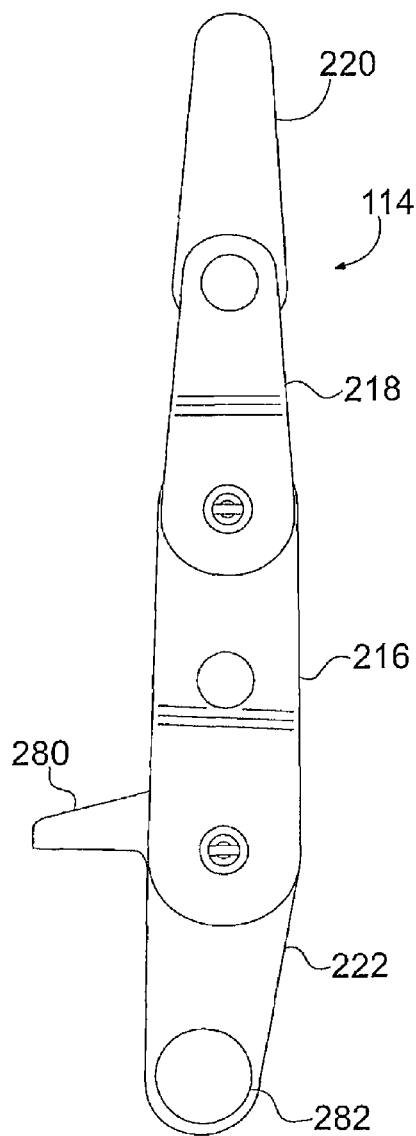
Figure 10C:
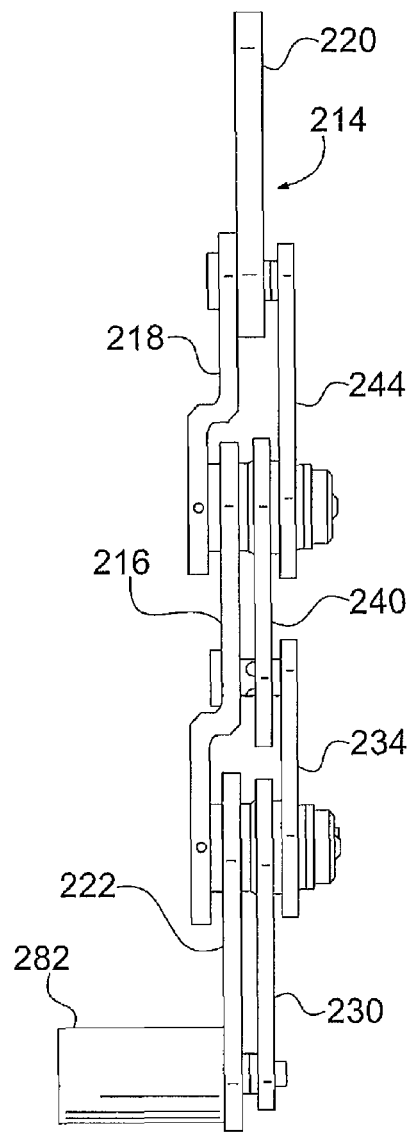

Finger 214 includes mechanical clutches which act like the belt creating friction on pulleys in finger 214, the mechanical clutches provide the same behavior. The transmission friction is controlled at the joints 224, 226, and 228 through use of joint clutches, and actuated using a chain, such as a steel chain or a toothed belt, and the joint to joint transmission ratios are controlled through intermediate sprocket ratios. With continuing reference to FIG. 10, the chain 230 connects the output sprocket 232 of motor 282 to the input sprocket of joint 224. The chain 234 connects the output sprocket 236 to the idler input sprocket 238. The chain 240 connects output sprocket 242. The chain 244 connects the output sprocket 246 to the input sprocket 248. However, the aspects of the belt embodiment are still present in this embodiment and, therefore, the design has the same bending characteristics, static equilibrium when pinching, and distributed force applied to whatever object is being grasped. A finger mount 280 can be used to mount the finger 214 on a palm actuator. FIGS. 10b-10e show different views of the finger in FIG. 10a. In addition, one skilled in the art could envision using other mechanical devices, such as gears.

Figure 11A:
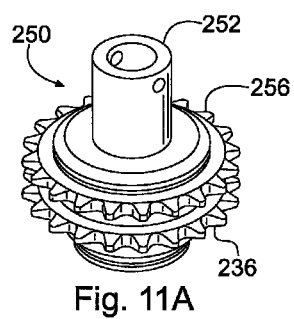
FIGS. 11a-11d are views of a clutch of the mechanical clutch.
Figure 11B:
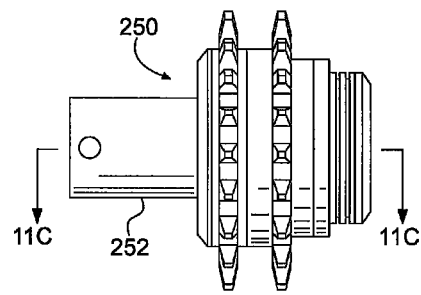
Figure 11C:
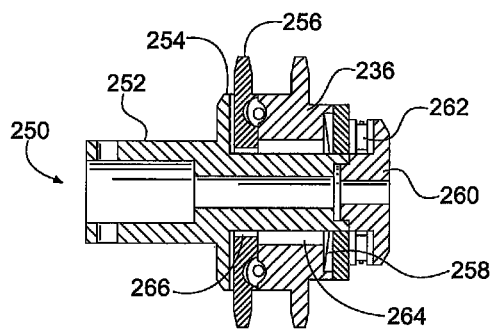

With reference to FIGS. 11a and 11b, torque reaction clutch 250 includes a cylindrical joint shaft 252. With reference to FIG. 11c, a cross-sectional view of the clutch 250, the shaft 252 defines on a flanged surface, a friction clutch disk 254. An input sprocket 256 and output sprocket 236 are mated to an end of the joint shaft, whereby an exterior surface of the input sprocket 256 engages the friction clutch disk 254. A spring member, such as a spring washer 258 can be positioned against an exterior surface of the sprocket arrangement, abetting the outer surface of output sprocket 236, a washer can hold the spring washer 258 in position. The spring washer 258 also causes the initial stiffness in the finger, even when the motor is not running. A spring washer can be preloaded to a predetermined level that is necessary for the proper operation of the finger and presses against the output sprocket pushing the components together causing a preset amount of friction between the shafts, thus allowing the finger to be preset, for pinching or various grasping tasks. Bearing end cap 260 can be connected to the end of the torque reaction clutch 250, including a roller thrust bearing 262. In addition, a bearing, such as radial roller bearing 264 is positioned on the joint shaft for the output sprocket 236 to ride on, with a bearing, such as plain radial bearing 266 for the input sprocket 256. The two cylindrical sprockets 236 and 252 are part of the clutch assembly in joint 224, with member inserted into pinhole 268 of joint shaft 252 securing the link 216 to the joint shaft 252, likewise the base 222 is inserted onto the shaft, such that the shaft is rotatably aligned inside a cavity formed on a leg of the base. A similar clutch assembly can be provided for joint 226, because the number of clutch assemblies is not meant to be limiting, as a finger can be envisioned having only one clutch assembly or in the alternative, more than two clutch assemblies.

A joint is needed to move two links relative to each other. The clutch 250 provides a mechanism to move a finger 214 using only one motor, providing a lightweight mechanism which can provide the desired force. In addition, the finger maintains a predicative behavior, opening and closing uniformly. The finger 214 also distributes a load across an object uniformly as predicated by the action of the torque reaction clutches.

The motor 282 of finger 214 drives the input sprocket 256 using chain 230. The movement of the input sprocket 256 causes the first link 216 to move when it engages the clutch disk 254 and thereby rotates the joint shaft 252 about its axis, the shaft 252 attached to the link 216. Initially, the other two joints 226 and 228 remain fixed relative to each other. When the links of the finger are prepositioned, they will hold their position as the first link 216 is closing. The link 216 rotates about joint 224 until it has engaged an object or has reached a limit, causing the joint shaft 252 to stop rotation. Once link 216 stops closing, clutch 254 will no longer freely move and the input sprocket 256 will slip in relation to the clutch disk 254.

When the engagement between the input sprocket 256 and clutch disk 254 slips, the sprockets 256 and 236 will rotate together and that motion will be transmitted further along the finger, causing the movement of the other joints, one by one. When the next link 218 engages the object, then and only then will the clutch slip in the second joint 226, and the motion will be transmitted through the last stop and cause the last link 220 of the finger to move. The clutch preset tension caused by the spring washer 258 holds the finger stiff.

The idler sprockets affix to each other as a cluster for changing ratio and transferring the motions. Input sprocket 238 and idler output sprocket 242 are between joint 224 and joint 226 and are a transfer mechanism to get the right ratio and the chain property for the next clutch. The idler sprockets are fixed to each other and change ratio and transfer motion. In one embodiment, the ratio is approximately, 2:1 from the first clutch to the second clutch. In addition, the ratio can be controlled from the second clutch to the last sprocket affixed to the link.

When link 220 stops moving because it hits an object, tension forms in the chain. The tension passes to each joint, forming resistance therein. The tension passes to the output sprocket 236, causing input sprocket 252 and output sprocket 236 of the torque reaction clutch 250 to rotate slightly opposite in relation to one another caused by resistance when the finger 214 is engaging an object. When they do, the relative torque between the sprockets causes further engagement of the clutch.

Figure 11D:
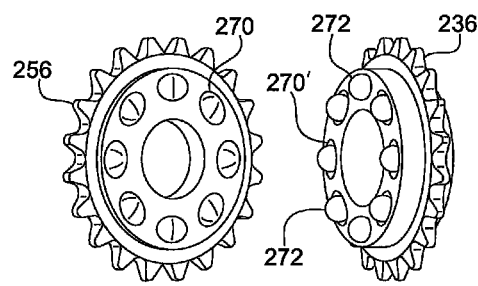

With reference to FIG. 11d, inner sprocket 256 and outer sprocket 236 include pockets on an inner engagement surface, such as helix pockets 270 and 270', on a mating surface, the pockets having helix ramps 270 and 270' which receive bearings, such as helix balls 272, the pockets having forming a cavity for the balls 272 when the sprockets are mated, the pockets defining ramps at various degrees on either side of the pockets 270 and 270'. When the sprockets are rotated relative to one another, in either direction, the movement causes the balls 272 to push the sprockets apart as the balls 272 roll on up the little pockets and the two gears separate.

The resistance in torque reaction clutch 250 forms between the clutch disk 254 and the inner sprocket 256. This will cause the counter movement between the inner sprocket and the outer sprocket, as the outer sprocket continues to turn to form tension between the spring washer and the clutch, and eventually the sprockets will move relative to one another, causing further stiffening of the joint.

When there is torque between the sprockets, the sprockets are pushed into a clutch plate, causing friction in the clutch. When the fingers are under load and there is torque between the input and output sprockets, friction increases because of this wedging action being created by the balls and the ramp causing the sprockets to push away. Torque is then sent to the clutch. The more torque that is present, the tighter the clutch gets.

The clutch preset tension holds the finger stiff. To pick up a wine glass, the finger is pretensioned to be able to wrap around a wine glass rather gently without breaking it. To do more aggressive work, like pick up a ballistic shell, it can be driven by the operator to grip much tighter. However, as that grip tightens, two things happen: The torque reaction clutch will kick in, the two gears tend to move apart and the one gear moves against the pressure plate in both the clutches. That is going to increase the stiffness of the finger. The finger gets very stiff and becomes a solid piece wrapped around the shell.

It also distributes the force. Because the clutches are getting tighter, the torque is transmitted to the first link unaffected, but somewhat diminished to the second link, and further diminished to the third link. This has the effect to distribute even pressure among the links against the object being gripped. The very last link 220 of the finger 214 does not need the clutch.

Figure 12:
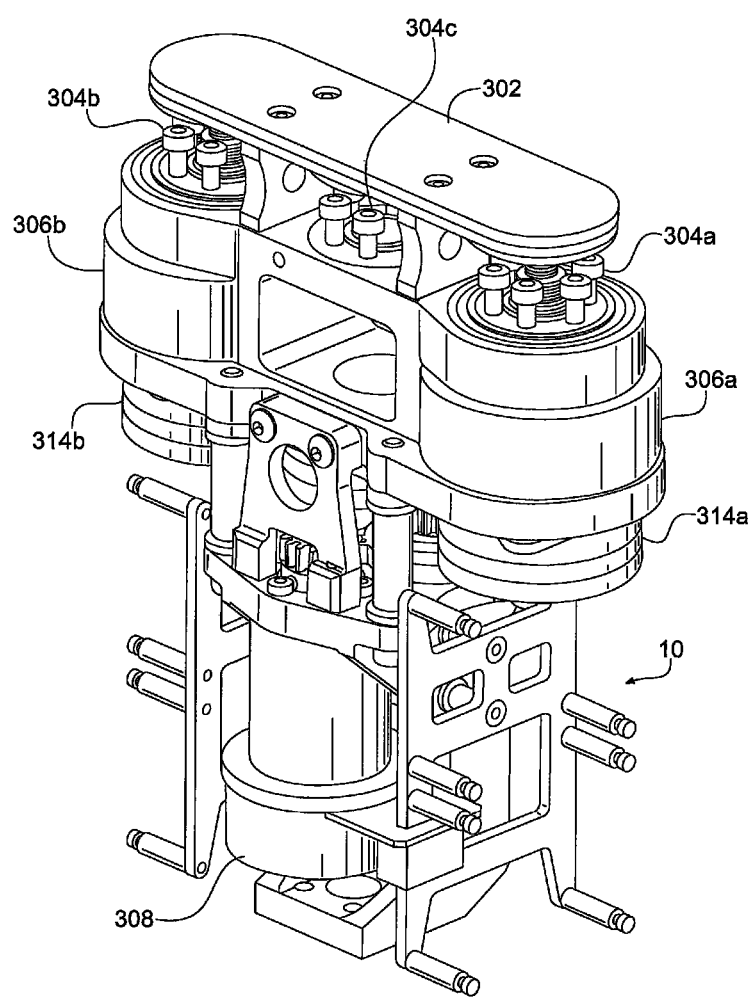
FIG. 12, is a side perspective view of the palm actuator of the present invention.

Returning to FIG. 1, the robotic hand 2 includes a palm actuator 10 for holding multiple fingers 4, 6, and 8. The palm actuator 10 provides electronics for operating the motors, and a single motor for swinging the adjustable fingers. With reference to FIG. 12, the palm actuator 10 is shown, including a palm plate 302, output shafts with bolts 309a-c for mounting adjustable fingers, a gear reducer, such as cycloidal reducers 306a and 306b, and a motor 308. The motor 308 is operated to move the adjustable fingers when mounted on the palm. Only one small motor, the multiple fingers can be adjusted rotationally about the palm plate and the mechanical transmission to adjust through input drive gears 314a and 314b. In one embodiment, the palm actuator 10 includes two gears that are counter-driven by the motor simultaneously to move two fingers at a time, however, one skilled in the art could envision providing alternate adjustable finger configurations, mounted on a palm, which could use one or more gears each. The motor 308 can be a relatively small and lightweight motor because the palm actuator 10 uses a gear reducer, which provides a number of dwell positions, where the mechanical advantage increases and can provide stopping points for the fingers to lock in place so that the motor is not loaded and the gearing between the motor and mechanism is not loaded. The palm assembly 10 is able to lift large loads, such as a 110 pound shell, while weighing between 5-15 pounds.

The gear reducer acts to provide a continuously varying ratio within each rotation of the input shaft. As the finger spins, the gear moves through dwell points, where the motor is spinning fast, but the finger movement decreases in speed, and when reaching the dwell point, it is moving only slightly. When in the dwell point, the relative force to resist any force applied to the finger is decreased, because the dwell point has an infinite mechanical advantage. At dwell points, an infinite mechanical advantage facilitates holding position. In the dwell position, the fingers can be locked and the motor does not have to hold the finger position anymore. The locking position allows the mechanism to carry the load when lifting very heavy objects, such as a heavy shell, mortar, or rock. In between dwell positions, a finite gear reduction occurs, as explained below.

When the operator starts opening and closing the fingers, the palm stops driving. To grip or pinch an object with the robotic hand assembly, the fingers can be positioned about the palm assembly axis and then opened and closed to grasp or pinch an object. While an object is being grasped, the palm assembly does not move, it just stays in place.

Figure 13:
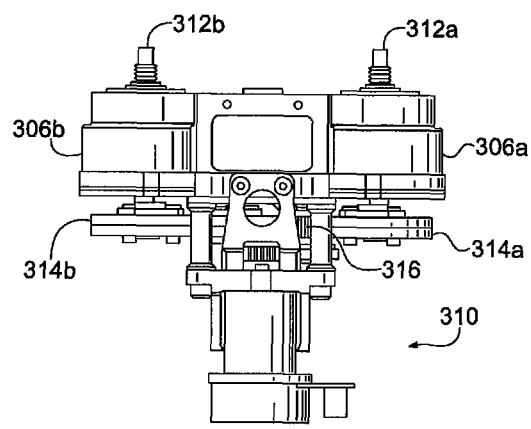
FIG. 13 is a front view of the palm actuator in FIG. 12 without the palm plate and bolts.

With reference to FIG. 13, the palm actuator 310 is shown without the palm plate 302 and engagement bolts 304a-c. The palm actuator 310 includes sensors 312a and 312b, which sense the position of the fingers. The input drive gears 314a and 314b are shown in contact with the motor output gear 316.

Figure 14A:
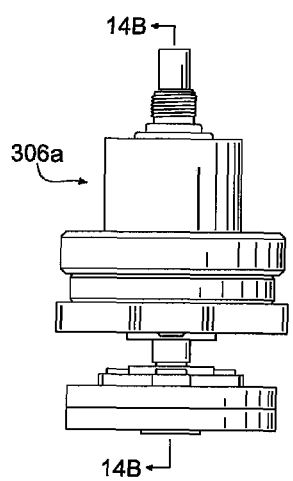
With reference to FIG. 14a, a front view of the cycloidal reducer in FIG. 13 is shown separated from the palm actuator.

With reference to FIG. 14a, cycloidal reducer 306a provides indexing to rotate the adjustable fingers on the palm. Only one small motor can adjust multiple fingers, because the transmission is through cycloidal reducer 306a which provides intermittent motion, such as indexing, swing. However, one skilled in the art can envision that other types of motion devices could provide indexing. The reducer 306a can be locked in place so that the motor is not loaded and the gearing between the motor and mechanism is not loaded. The cycloidal reducer indexes as the motor transmission turns its gears.

Figure 14B:
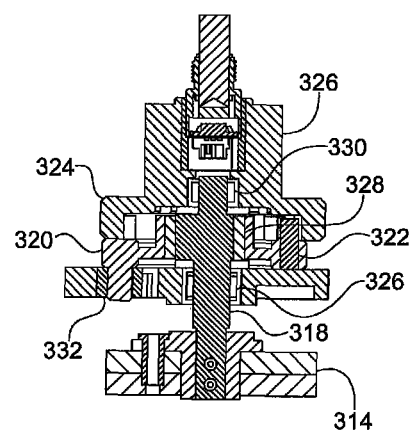

With reference to FIG. 14b, a cross-sectional view of the cycloidal reducer 306a of FIG. 14a shows the gears and other parts that make up the cycloidal reducer 306a. The cycloidal reducer 306a includes input drive gear 314a connected using a member, such as a pin, to connect the gear 314a to a shaft, such as eccentric shaft 318. The shaft 318 is not symmetrical about the centerline. The shaft passes through and engages a cavity of a gear, pin gear 320. The pin gear 320 includes pins that act on valleys 338 of the output gear 324. The cycloidal reducer 306a includes shaft 326 for receiving the finger mount of the adjustable fingers. In addition, bearings 326, 328, 330, and 332 are placed to facilitate the rotational movement of the gears and shaft.

Figure 14C:
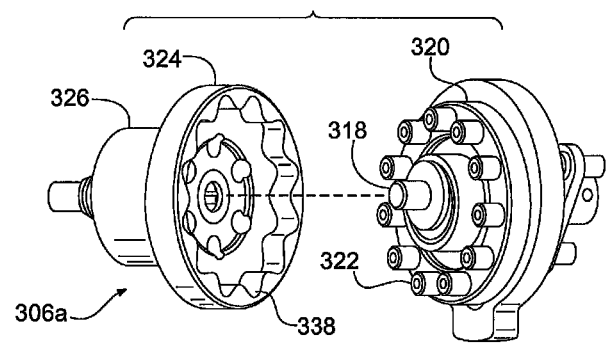
FIG. 14c is a view of the gear reducer when separated.

With reference to FIG. 14c, the gear reducer includes an input housing and output cycloidal gear 324 that can be fabricated into the output shaft 326. The pins 322 of the input pin gear 322 are positioned around the pin gear 322.

Figure 15A:
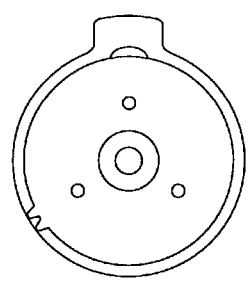
FIG. 15a is a view of the gear reducer from the front.
Figure 15B:
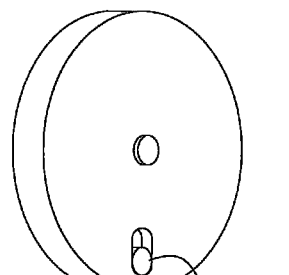
FIG. 15b is a view of the gear reducer from the back.
Figure 15C:
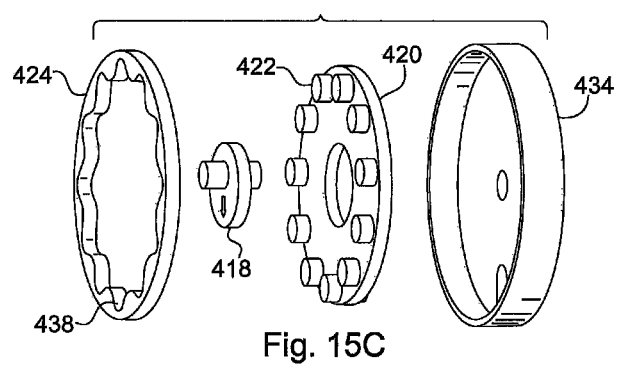
FIG. 15c is an exploded view of the parts of the cycloidal gear in FIGS. 15a and 15b.
Figure 16A:
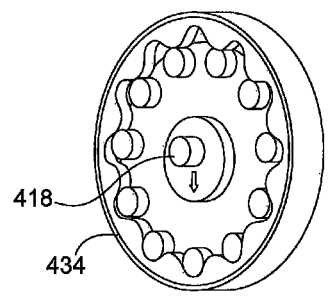
FIGS. 16a-16e illustrate the gear reducer in operation.
Figure 16B:
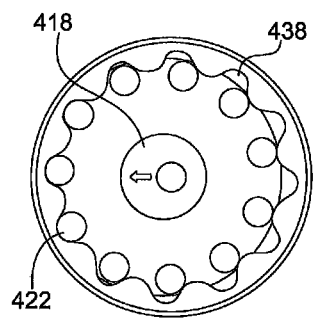
Figure 16C:
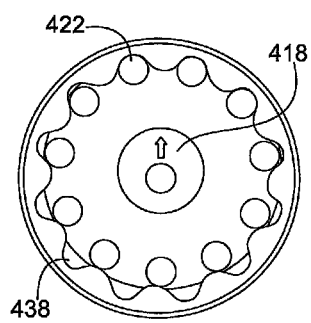
Figure 16D:
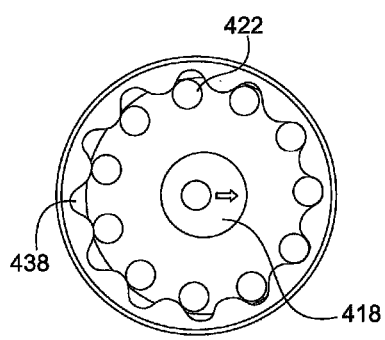
Figure 16E:
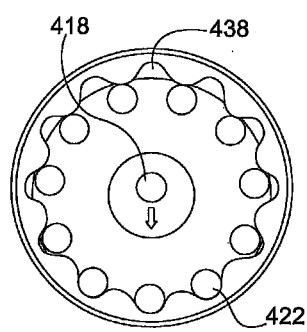

With reference to FIG. 15a, for illustration purposes, a gear reducer 406 is shown from the front, with FIG. 15b showing the same portion from the back of the housing 434, with the control pin 436, for guiding the pin gear in relation to the cycloidal gear 424. FIG. 15c is an exploded view of the parts of the cycloidal gear reducer, including the output cycloidal gear 424 having valleys, such as cycloidal teeth 438, the eccentric shaft 418, the pins 422 of pin gear 420, and the housing 434.

With reference to FIGS. 16a-16e, the gear reducer is shown in operation, exemplifying the indexing in stages. In the figure, the output housing 434 part of the drive remains fixed. The input shaft 418 is mounted eccentrically on the input eccentric. As the eccentric shaft 418 rotates, causing the pin gear 420 to walk around the rings of the output gear 416. Therefore, one complete turn of the input eccentric causes $\frac{1}{12}$ of a turn of the ring gear 416. In one embodiment, there are 11 pins on the pin gear 420 and 12 valleys in the ring gear 416, but the ring gear 416 can have any number of valleys 438 and the pin gear 420 having one less pin. In the 12 tooth embodiment, the actual mechanical advantage of the system varies from 6:1 to infinite, but averages 12:1 (the number of valleys 438 in the ring gear 424). The FIGS. 16a-16e show one complete revolution of the input eccentric causing a pin to move from valley to valley on the ring gear. The actual horizontal distance that is moved by the ring gear at each point is the gear reduction. Note that in the first 90 degree rotation of the center gear, the outer gear has hardly moved. However, during the next 90 degrees of rotation, it has moved half-way to the next valley. This is the result of the control pin 336 being coincidentally positioned on the pitch circle of the pin gear 320.

During the 30° cycle, the fingers slow and come to a stop and as the motor continues to spin, the motion of the finger will start to move again. Dwell stations are positioned where the motor stops. A dwell point can be used to lock the fingers and reduce load on the motor. Minimal motor torque can hold the dwell point position even as counter force is applied.

With reference to FIG. 17, the adjustable fingers 6 and 8, rotate on the palm to any position change configurations providing different configurations of the hand. The fingers can be positioned all on one side, like a hand scooping something up off the ground, or positioned at 150° or 120° apart, for grabbing a baseball. In addition, the fingers can be completely opposing, for tasks such as grabbing a pipe. The hand can also be preconfigured to grasp or pinch, such as grasping a 2×4 across the three fingers or pinching a wire, using just two fingers. In one embodiment, different configurations of finger assemblies can occur every thirty degrees because the motor cycles by stopping around the circle, and it can have seven stopping positions in a 180° frame. FIG. 17 shows the configurations as the fingers reach these dwell points. At 0°, all three fingers are next to each other. At 30°, all three fingers are spaced apart such as when grabbing for a ball. At 60°, all three fingers are spaced apart, such as when grabbing for a ball. At 90°, if the fingers close, they will be pinching something such as pinching wires or grabbing wires. At 120°, all three fingers are equally spaced apart, such as when grabbing for a ball. At 150°, all three fingers are spaced apart, such as when grabbing for a ball. The last position is 180°, which is opposing for all fingers. All of the angles are a function of 30° increments, which allows the locking position at 90°, 120°, and 180° degrees. As the motor drives the gear reducer, rotation of the fingers continues and the motor goes back to an infinite mechanical advantage every 30°, providing more torque or force. Gripping of objects at other palm positions are possible, but with reduced load capabilities.

If power was lost, it would hold position and no amount of input force on the finger can make it move when it is in the infinite mechanical position.

Although the invention has been described in detail for the purpose of illustration, based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A robotic finger assembly comprising:
  a base for mounting said finger to a robotic hand, said base having a motor;
  at least two links, said links connected to each other and said base by a joint;
  a joint shaft and a pivot shaft comprising said joints, said pivot shaft freely moving within its respective joint shaft and connected to a preceding link, wherein said motor is activated for opening or closing said finger;
  said finger further comprising clutches associated with each joint, said clutches activated as closing tension in the finger increases, said tension providing pressure on each finger link, said tension distributed to the joints as a function of said clutches in said joints;
  wherein said clutch comprises:
  a joint pulley comprising an inner surface, said inner surface of the joint pulley engaging an outer surface of the pulley shaft, said engaging surfaces forming control friction;
  an intermediate pulley comprising an inner surface, said inner surface of the joint pulley engaging an outer surface of the intermediate shaft, said engaging surfaces forming control friction; and
  a belt, said belt threaded onto said joint pulley and intermediate pulley, wherein the clutch is activated when the link engages an object, causing tension in the belt and forcing the joint pulley to move relative to at least one of the joint shaft and the intermediate pulley to move relative to the intermediate shaft wherein said relative movement causes control friction in the joint.

2. The robotic finger assembly of claim 1, further comprising a drive train attached to the belt, the motor activating the drive train to pull the belt to close the finger, wherein the drive train forces tension to the front of the finger.

3. The robotic finger assembly of claim 1, wherein control friction is configurable to achieve a specific pressure distribution.

4. The robotic finger assembly of claim 1, wherein the control friction is configured by changing the radius of the pulley shaft and joint pulley, wherein increasing the pulley shaft in relation to the joint pulley, increases resistance.

5. The robotic finger assembly of claim 1, wherein the belt is pretensioned to cause stiffness in the finger.

6. A robotic finger assembly comprising:
- a base for mounting said finger to a robotic hand, said base having a motor;
- at least two links, said links connected to each other and said base by a joint;
- a joint shaft and a pivot shaft comprising said joints, said pivot shaft freely moving within its respective joint shaft and connected to a preceding link, wherein said motor is activated for opening or closing said finger;
- said finger further comprising clutches associated with each joint, said clutches activated as closing a tension in the finger increases, said tension providing pressure on each finger link, said tension distributed to the joints as a function of said clutches in said joints;
- wherein said clutch comprises:
- an input sprocket, an output sprocket, and balls;
- said input sprocket and output sprocket each comprising ramps on an inner surface for receiving said balls;
- said input sprocket engaging said output sprocket forming a cavity;
- a chain, said chain running the input sprocket; and
- a joint shaft, wherein friction increases as said input sprocket rotates relative to said output sprocket, wherein balls engage the ramps within said cavities pushing the input sprocket from the output sprocket, and into a friction disk on the joint shaft.

7. The robotic finger assembly of claim 6, wherein tension in the finger causes said sprockets to move relative to each other increasing friction.

8. The robotic finger assembly of claim 6, further comprising a spring, the spring for engaging the output sprocket and causing stiffness in the joint.

9. The robotic finger assembly of claim 6, further comprising a second chain rotatably connecting said output sprocket to a next input sprocket of the finger.

10. The robotic finger assembly of claim 6, wherein the ramp angles are adjusted to control sensitivity, further wherein a shallow ramp angle will increase sensitivity.

11. A robotic hand assembly for grabbing and pinching an object, comprising:
- an adjustable finger and a stationary finger, the fingers comprising a base for mounting said finger to a robotic hand, said base having a motor;
- at least three links, said links connected to each other and said base by a series of joints;
- a joint shaft and a pivot shaft comprising said joints, said pivot shaft freely moving within its respective joint shaft and connected to a preceding link, wherein said motor is activated for opening or closing said finger; and
- a palm assembly, the palm assembly comprising a gear reducer, a finger mount and a motor, wherein said fingers are mounted to said palm assembly, wherein said motor activates said gear reducer, such that said gear reducer swings the adjustable finger.

12. The robotic hand assembly of claim 11, wherein said gear reducer provides dwell points for positioning the adjustable finger where a mechanical advantage exists.

13. The robotic hand assembly of claim 11, wherein said gear reducer is an indexing cycloidal gear reducer.

* * * * *

UNITED STATES PATENT AND TRADEMARK OFFICE
CERTIFICATE OF CORRECTION

| | | |
|---|---|---|
| PATENT NO. | : 8,991,884 B2 | Page 1 of 1 |
| APPLICATION NO. | : 14/006433 | |
| DATED | : March 31, 2015 | |
| INVENTOR(S) | : Mark J. DeLouis | |

It is certified that error appears in the above-identified patent and that said Letters Patent is hereby corrected as shown below:

In the Claims

Column 15, Line 21, Claim 6, after "closing" delete "a"

Signed and Sealed this
Twenty-eighth Day of July, 2015

Michelle K. Lee
*Director of the United States Patent and Trademark Office*